United States Patent Office 2,828,266
Patented Mar. 25, 1958

2,828,266

PROCESS FOR BREAKING PETROLEUM EMULSIONS

Melvin De Groote, University City, and Alvin Howard Smith, Glendale, Mo., assignors to Petrolite Corporation, Wilmington, Del., a corporation of Delaware No Drawing. Application August 3, 1955
Serial No. 526,329

27 Claims. (Cl. 252—332)

The present invention relates to processes or procedures particularly adapted for preventing, breaking, or resolving petroleum emulsions of the water-in-oil type, and particularly petroleum emulsions.

Our invention provides an economical and rapid process for resolving petroleum emulsions of the water-in-oil type that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The present invention is concerned with a process for breaking petroleum emulsions of the water-in-oil type characterized by subjecting the emulsion to the action of a demulsifying agent comprising a mixture of at least 60% by weight and not over 90% by weight of (A) a conventional aromatic solvent-soluble non-ionic demulsifier, and at least 10% by weight and not over 40% by weight of (B) ammonium salts obtained by the monosulfonation and neutralization of nonyl phenol foots. The foots are characterized by a dinonyl phenol to nonyl phenol ratio within the range of 2:1 to 3:1 and contain not less than 90% of nonylated phenols.

The non-ionic demulsifiers of the kind described are well known and numerous examples will be included subsequently. Nonyl phenol foots consisting largely of dinonyl phenol and sometimes referred to as dinonyl phenol crude or as nonyl phenol bottoms has been available only recently as a commercial product. The reason is as follows: Nonyl phenol is finding substantial use in the form of its ethylene oxide addition product as a synthetic detergent. The nonyl phenol is preferably colorless and free from dinonyl phenol. In the alkylation of phenol to produce the nonyl phenol there is invariably produced some dinonyl phenol. The nonyl phenol is removed by distillation. The residual product, referred to as nonyl phenol bottoms, nonyl phenol foots, or as crude dinonyl phenol, depending on its method of manufacture, may contain as much as 75% of dinonyl phenol and as little as 25% of nonyl phenol. A product obtained from another manufacturer contained approximately 65% dinonyl phenol and 35% nonyl phenol. Various samples contain the two phenols in amounts equivalent to 90–100% of the product. The commercially available product appeared to contain little or no trinonyl phenol but may have some polymerized nonylene or the like. A typical example of commercially available product is characterized by the following:

Physical form _____ Viscous amber liquid.
Boiling point _____ 5% (760 mm.); over 325° C.
Hydroxyl number _____ 145–165.
Specific gravity _____ At 25°/25° C.: .90–.92.

For the above reason we are not aware whether sulfonated nonyl phenol foots have been described in the patent literature or elsewhere and for this reason there will be included a complete description of the monosulfonation followed by conversion into the ammonium salt.

For convenience what is said hereinafter is divided into five parts:

Part I is concerned with the utilization of oil soluble sulfonates in demulsifying process;

Part II is concerned with the preparation of the sulfonate derivatives of nonyl phenol foots;

Part III is a description of conventional aromatic solvent soluble nonionic demulsifiers used as one of the two compounds in the mixture which exemplified the present process;

Part IV is concerned with suitable mixtures of the materials described in Part II and Part III preceding to yield the demulsifiers as herein employed.

Part V is concerned with the use of said demulsifiers for the resolution of petroleum emulsions of the water-in-oil type.

PART I

The use of sulfonates for resolution of petroleum emulsions is well known. See U. S. Patent 1,299,385, dated April 1, 1919, to Rogers. It is noted in said patent that it was concerned primarily with the use of sulfonates obtained from mineral oil. Over a period of years although a large number of petroleum sulfonates have been used in demulsification either as the sole component of the demulsifier or in admixture with other well known demulsifiers it has happened that for many years the overwhelming percentage of such material, probably more than 90% consumed as demulsifiers, happened to be oil soluble type or mahogany acid soap type.

For a number of years it has been recognized that although the composition of mahogany soaps might vary, and undoubtedly does vary, a better understanding of the oil solubility of hydrocarbon sulfonates is obtained by a study of alkylated aromatic sulfonates.

U. S. Patent 2,448,184, dated August 31, 1948, to Lemmon states: "Sulfonated alkyl aromatic hydrocarbons have been widely used as wetting, washing, emulsifying and detergent agents. Depending upon the length of the alkyl chain of the alkyl substituent, the sulfonated alkyl aromatic hydrocarbons are either preferentially water-soluble or preferentially oil soluble. For example, alkyl benzene sulfonates in which the alkyl group contains from about 10 to about 15 carbon atoms are preferentially water-soluble and are useful as wetting and/or detergent agents. The higher alkyl benzene sulfonates, that is, alkyl benzene sulfonates containing more than 16 carbon atoms and usually from about 18 to about 30 carbon atoms in the alkyl groups, are preferentially oil soluble. These preferentially oil-soluble alkyl aromatic sulfonates in many respects resemble the preferentially oil-soluble sulfonates obtained on the treatment of petroleum oils with concentrated or fuming sulfuric acid. These preferentially oil soluble petroleum sulfonates, because of their characteristic color are generally referred to as mahogany soaps although certain preferentially oil-soluble petroleum sulfonates having a characteristic brownish color are called brown acid soaps."

Thus, oil soluble petroleum sulfonates obtained in the manner described in the aforementioned patent U. S. 2,448,184 are obviously a substitute for mahogany soap for a variety of purposes for which mahogany soaps are ordinarily used.

In the aforementioned U. S. Patent 2,448,184 it was also pointed out that hydroxy compounds, i. e., phenols can be sulfonated in the manner described. The patent states:

"The present invention can be applied to a wide variety of alkyl aromatic compounds in which the alkyl substituent has at least 18 carbon atoms in the chain. The aromatic nucleus can be, for example, benzene, toluene, xylene, cumene, naphthalene, methyl naphthalenes, ethyl naphthalenes, isopropyl or alkyl naphthalenes, diphenyl, alkyl phenyls, anthracene, and alkyl anthracene. Halogen, nitro, hydroxy or other derivatives of the aromatic hydrocarbons can also be sulfonates in accordance with the present invention."

The process described in said aforementioned patent U. S. 2,448,184 involves the use of anhydrous sulfur trioxide. See claim 1. However, it is known that when sulfur trioxide is employed that changes may take place in the side chain or side chains. See British Patent 664,577 which in discussing sulfonation of an alkyl aromatic hydrocarbon states as follows:

"The difficulties associated with the sulfonation of long chain alkyl-aromatic hydrocarbons are especially acute in the case of polysubstituted benzenes, for example the long chain alkyl toluenes such as dodecyltoluene. The introduction of a sulfonic group into the nucleus tends to displace the long chain alkyl group, particularly if it is tertiary and to lesser extent if it is secondary. This displacement, which is negligible with monoalkyl benzenes, is increased as the temperature increases, and may reach as high as 20 percent in the case of p-tertiary dodecyl toluene above 40° C. The displacement, or dealkylation is accompanied by complex side reactions involving oxidation, hydrogen-transfer, and tar formation, with accompanying sulfonation of both the tar and the dealkylated benzene nucleus, that are reactions which are all undesirable in the manufacture of high quality detergent sulfonic acids."

In light of the lack of specificity in regard to the composition of mahogany soaps and in regard to oil soluble sulfonates obtained by the sulfonation of alkylated aromatics particularly alkylated benzene, then the introduction of 18 carbon atoms or more, a single side chain or more than one side chain, generally yields oil soluble sulfonates. Needless to say, in the case of a phenol if one introduces three alkyl radicals it might be more difficult to sulfonate than if the product were mono or disubstituted and thus tend towards the increased production of by-products.

For the above reason although as stated it is not known whether sulfonated nonyl phenol foots or bottoms have been described and also notwithstanding the fact that the total number of carbon atoms in the side chain may be somewhat less than the normal borderline, i. e., about 15 carbon atoms instead of 18 and notwithstanding the fact that the hydroxyl radical does contribute a hydrophile effect, even so no claim is made in regard to these herein described sulfonates alone as demulsifiers. Likewise no significance is attached to the above statement that the alkyl carbon atoms even where there are as many as 18 present are divided into two alkyl chains. Even so the invention is not concerned with the use of another oil soluble sulfonate as such but to its use in combination with the components of a demulsifying mixture described in Part III following. In such mixture as will be pointed out in Part IV following the effectiveness of the sulfonate is to be found largely in introducing an anti-sludging property in the sense that when demulsification does take place by means of a mixed demulsifier a comparatively clean interface is obtained at the interface surface between the oil and water layer, or at least a bright transparent upper oil layer.

PART II

As previously pointed out sulfonation of the phenolic materials is conventional and one can use any one of a number of acceptable sulfonating agents such as sulfur trioxide, oleum, etc. The acid mass is neutralized with anhydrous ammonia or commercial aqua ammonia. The following examples 1a through 6a illustrate such procedure.

*Example 1a*

A 100 lb. charge of nonyl phenol foots was placed in a conventional sulfonator. These foots consisted of approximately 75% dinonyl and 25% mono nonyl phenol. The sulfonator was made of stainless steel and equipped with a turbine agitator, cooling and heating jacket, and the conventional inlets and outlets. For a description of a typical sulfonator, see "Unit Processes in Organic Synthesis," Groggins, 4th ed. McGraw-Hill, N. Y., 1952, p. 266. The batch was agitated while 55 lb. of 25% oleum was run in. The oleum addition was controlled so as not to produce a temperature higher than 80° C. After this, the batch was agitated for 1 hr. and then cooled back to 40° C. 28 lb. of water was added and the batch allowed to settle overnight. When the spent acid had been withdrawn, a yield of 121 lb. of sulfonic acid remained. This was diluted with an aromatic solvent in order to reduce the viscosity, and 27 lb. of ammonium hydroxide was added to neutralize the batch. More solvent was added so as to give a product containing 75% active sulfonate. The active ingredients contained about 12.5% combined $SO_3$ plus 1.5% free $SO_3$ and were completely soluble in such solvents as xylene and kerosene. Free $SO_3$ as described in these examples refers to $SO_3$ in the form of sulfuric acid.

*Example 2a*

In this example, the crude nonyl phenol foots contained about 65% dinonyl phenol and 35% nonyl phenol. The sulfonator used was the same as described in Example 1a, preceding. 100 lb. of the phenols was sulfonated at 80° C. as before with 65 lb. of 25% oleum. After being washed with 35 lb. of water and settled overnight, the sulfonic acids were separated from the spent acid by drawing off the acid. The yield was 126 lb. Solvents were added together with 29 lb. of ammonium hydroxide. The active sulfonate contained 14% combined $SO_3$ plus 1.2% free $SO_3$. The batch was adjusted to 75% active with solvent and appeared to have properties very similar to the sulfonate in Example 1a.

*Example 3a*

A crude phenol was sulfonated exactly as in Example 2a, preceding, with identical amounts of reactants. This phenol consisted of 68% dinonyl phenol, 25% nonyl phenol, and 7% of non-phenolic matter. The non-phenols were assumed to be aromatic hydrocarbons and perhaps some polymerized nonenes. The yield of sulfonic acid was 123 lb. The active material contained 14.2% combined $SO_3$ plus 2% free $SO_3$. The ammonium sulfonates were soluble in xylene, kerosene, alcohol, and similar solvents. The sulfonate was adjusted to 75% of active material with an aromatic solvent.

*Example 4a*

The crude phenol of Example 1a was sulfonated with anhydrous sulfur trioxide. The reactor used was similar to the type described in British Patent 664,577 to Newby, January 9, 1952. 100 lbs. of the phenol was held at 75° C. while 15 lb. of sulfur trioxide gas was run in over a 2 hr. period. The $SO_3$ gas was diluted with 9 volumes of dry air. A yield of 114.5 lb. of sulfonic acid was obtained, containing 12% combined SO₃ and 0.7% free SO₃. Solvent was added in an amount such that a 75% active sulfonate remained after neutralization with 26 lb. ammonium hydroxide. The product was slightly more viscous and darker than that of Example 1a, but otherwise substantially identical.

*Example 5a*

The crude phenol of Example 2a was used in this case. 100 lb. was charged to the sulfonator together with 30 lb. of mineral spirits. The solvent was added merely to reduce viscosity and took no part in the sulfonation. 16 lb. of gaseous SO₃ diluted with 9 volumes of dry air was admitted over a 2 hr. period. The yield was 115.5 lb. of sulfonic acids containing 13% combined SO₃ and 0.4% free SO₃. 27.5 lb. of ammonium hydroxide were required for neutralization. Additional solvent was added to give a product containing 75% ammonium sulfonates.

*Example 6a*

The crude phenol of Example 3a was reacted with 16 lb. of SO₃ as described in Example 5a. The active sulfonic acids contained 13.2% combined SO₃ and 0.4% free SO₃. The batch was adjusted to 75% active and was similar in appearance to the product of Example 5a. The product was soluble in xylene, kerosene, and alcohol.

PART III

As previously stated the demulsifying agents employed in the present process are obtained by mixing ammonium sulfonates of the kind described elsewhere in this specification with conventional nonionic aromatic soluble demulsifiers. Conventional nonionic demulsifiers are obtained by a reaction with ethylene oxide, propylene oxide, butylene oxide and glycide. The initial reactant may be a water soluble product such as alcohol, alkylated phenol, an amide, acid, or the like. Such reactants may and usually do contain at least one radical having not less than 8 uninterrupted carbon atoms.

In some instances, however, one may start with water soluble substances for instance low molal glycols such as ethylene glycol, propylene glycol, butylene glycol or low molecular weight polymers thereof or some other hydroxylated material such as pentaerythritol, sorbitol or the like. Such products are characterized by the fact that even after oxyalkylation there is not present any radical having as many as 8 uninterrupted carbon atoms. In such instances the manufacture of conventional nonionic demulsifying agent invariably involves the use of either propylene oxide or butylene oxide or both along with either ethylene oxide or glycide or both. Some conventional nonionic demulsifiers may have free carboxyl radicals or may be obtained by linear polymerization between a low molal dicarboxy acid and an alkylene oxide derivative. The unneutralized carboxyl group does not introduce any measurable anionic surface active properties.

In some instances effective conventional demulsifying agents are made which are initially hydrophile in character comparable to ordinary household liquid detergent. They are insoluble in aromatic hydrocarbons which is understood to mean a non oxygenated hydrocarbon aromatic solvent such as benzene, toluene, xylene, high boiling solvent derived from coal tar, cracking petroleum, hydrogenated coal, etc. A large number of conventional nonionic demulsifying agents are soluble in the aromatic solvent of the kind described. For example one can readily prepare a solution of 10 parts of such conventional demulsifier by weight and 100 parts of xylene by weight at ordinary or slightly elevated temperatures.

The present invention is limited to such aromatic solvent soluble nonionic demulsifiers.

Demulsifiers of the type referred to immediately preceding are described in a number of patents. See U. S. Patent No. 2,499,365, dated March 7, 1950, to De Groote and Keiser. Still another type is the kind described in U. S. Patent No. 2,562,878, dated August 7, 1951, to Blair.

Other types are obtained by the oxyethylation of polypropyleneglycols. See U. S. Patent No. 2,674,619, dated April 6, 1954, to Lundsted.

See also U. S. Patent No. 2,626,942, dated January 27, 1953, to De Groote; U. S. Patent No. 2,629,704, dated February 24, 1953, to De Groote et al.; U. S. Reissue Patent No. 23,851, dated July 13, 1954, to De Groote et al.; U. S. Patent No. 2,629,706, dated February 24, 1953, to De Groote et al.; U. S. Patent No. 2,549,434, dated April 17, 1951, to De Groote et al.; U. S. Patent No. 2,552,528, dated May 15, 1951, to De Groote; and U. S. Patent No. 2,552,529, dated May 15, 1951, to De Groote.

Typical conventional nonionic aromatic solvent soluble demulsifiers are indicated in the following table:

TABLE I

| Example No. | Description of aromatic solvent soluble nonionic demulsifiers |
|---|---|
| 1b | See Example 18C in aforementioned U. S. Patent No. 2,626,942. |
| 2b | See Example 26C in aforementioned U. S. Patent No. 2,626,942. |
| 3b | See Example 43C in aforementioned U. S. Patent No. 2,626,942. |
| 4b | See demulsifier defined by claim 3 of aforementioned U. S. Patent No. 2,629,704. |
| 5b | See demulsifying agent defined by claim 5 of aforementioned U. S. Patent No. 2,629,704. |
| 6b | See demulsifying agent defined by claim 6 of aforementioned U. S. Patent No. 2,629,704. |
| 7b | See demulsifying agent defined by claim 3 of aforementioned Reissue Patent U. S. 23,851. |
| 8b | See demulsifying agent defined by claim 4 of aforementioned Reissue Patent U. S. 23,851. |
| 9b | See demulsifying agent defined by claim 5 of aforementioned Reissue Patent U. S. 23,851. |
| 10b | See demulsifying agent defined in claims 3, 4 and 5 of aforementioned U. S. Patent 2,629,706. |
| 11b | See demulsifying agent defined in claim 9 of aforementioned patent U. S. 2,562,878, and derived from polypropyleneglycol molecular weight, 2,000. |
| 12b | See demulsifying agent defined in claim 9 of aforementioned patent U. S. 2,562,878, and derived from polypropylene glycol molecular weight 2,250. |
| 13b | See demulsifying agent defined in claim 9 of aforementioned patent U. S. 2,562,878, and derived from polypropylene glycol molecular weight 2500. |
| 14b | See demulsifying agent defined in claim 9 of aforementioned patent U. S. 2,562,878, and derived from polypropylene glycol molecular weight 2,750. |
| 15b | See industrial pamphlet "Pluronics" of Wyandotte Chemical Corporation, Wyandotte, Michigan. Pluronic L—72. See also aforementioned U. S. Patent 2,674,619. |
| 16b | See industrial pamphlet "Pluronics" of Wyandotte Chemical Corporation, Wyandotte, Michigan. Pluronic L—62. See also aforementioned U. S. Patent 2,674,619. |
| 17b | See industrial pamphlet "Pluronics" of Wyandotte Chemical Corporation, Wyandotte, Michigan. Pluronic L—64. See also aforementioned U. S. Patent 2,674,619. |
| 18b | See industrial pamphlet "Pluronics" of Wyandotte Chemical Corporation, Wyandotte, Michigan. Pluronic L—31. See also aforementioned U. S. Patent 2,674,619. |
| 19b | See industrial pamphlet "Pluronics" of Wyandotte Chemical Corporation, Wyandotte, Michigan. Pluronic L—61. See also aforementioned U. S. Patent 2,674,619. |
| 20b | See industrial pamphlet "Pluronics" of Wyandotte Chemical Corporation, Wyandotte, Michigan. Pluronic L—81. See also aforementioned U. S. Patent 2,674,619. |
| 21b | See industrial pamphlet "Pluronics" of Wyandotte Chemical Corporation, Wyandotte, Michigan. Pluronic L—42. See also aforementioned U. S. Patent 2,674,619. |
| 22b | See industrial pamphlet "Pluronics" of Wyandotte Chemical Corporation, Wyandotte, Michigan. Pluronic L—33. See also aforementioned U. S. Patent 2,674,619. |
| 23b | See Example B in aforementioned U. S. Patent 2,549,434. Propylene oxide added first, then ethylene oxide. |
| 24b | See Example E in aforementioned U. S. Patent 2,549,434. Propylene oxide added first, then ethylene oxide. |
| 25b | See Example C in aforementioned U. S. Patent 2,549,434. Propylene oxide added first, then ethylene oxide. |
| 26b | See Example M of aforementioned U. S. Patent 2,552,529. Propylene added first, then ethylene oxide. |
| 27b | See Example 25 of aforementioned U. S. Patent 2,552,528. |

NOTE.—"Pluronics" is the trademark of Wyandotte Chemicals, used to identify products of the kind described in aforementioned U. S. Patent 2,674,619.

PART IV

Demulsifiers are ordinarily used in concentrations of approximately 50 to 80%. The purpose is to supply the demulsifier in the form of a liquid which can be employed by means of a metering pump or other measuring device.

Since solvent is usually present in the final mixed product we have found it more convenient to make a solution of the ammonium sulfonate and the nonionic demulsifier separately in a high boiling aromatic solvent. Generally, a 65% to 75% solution is used. The two solutions are then mixed so as to give the desired ratio between the two components and have a suitable solvent present. More solvent can be added if desired. Hereto attached Table II illustrates a variety of suitable mixtures.

TABLE II.—MIXED DEMULSIFIER

[Ammonium sulfonates used is indicated by designation 1a, 2a, etc. in parentheses. The nonionic demulsifier used is indicated by the designation 1b, 2b, etc. outside the parentheses. The percentage by weight of ammonium sulfonates used is indicated at the head of the column and the remainder is nonionic demulsifier. Percentage by weight is on solvent free basis.]

| Ex. No. | 10% | 20% | 25% | 33.3% | 40% |
|---|---|---|---|---|---|
| 1c | 1b (1a) | ( ) | ( ) | ( ) | ( ) |
| 2c | 2b ( ) | (1a) | ( ) | ( ) | ( ) |
| 3c | 2b ( ) | (2a) | ( ) | ( ) | ( ) |
| 4c | 4b ( ) | ( ) | (3a) | ( ) | ( ) |
| 5c | 4b ( ) | ( ) | (6a) | ( ) | ( ) |
| 6c | 6b ( ) | ( ) | (4a) | ( ) | ( ) |
| 7c | 8b ( ) | (5a) | ( ) | ( ) | ( ) |
| 8c | 8b ( ) | (6a) | ( ) | ( ) | ( ) |
| 9c | 9b ( ) | (5a) | ( ) | ( ) | ( ) |
| 10c | 10b (4a) | ( ) | ( ) | ( ) | ( ) |
| 11c | 11b ( ) | (4a) | ( ) | ( ) | ( ) |
| 12c | 12b ( ) | (3a) | ( ) | ( ) | ( ) |
| 13c | 13b (2a) | ( ) | ( ) | ( ) | ( ) |
| 14c | 14b (1a) | ( ) | ( ) | ( ) | ( ) |
| 15c | 15b (2a) | ( ) | ( ) | ( ) | ( ) |
| 16c | 16b ( ) | (4a) | ( ) | ( ) | ( ) |
| 17c | 17b ( ) | ( ) | (5a) | ( ) | ( ) |
| 18c | 19b ( ) | (6a) | ( ) | ( ) | ( ) |
| 19c | 20b (1a) | ( ) | ( ) | ( ) | ( ) |
| 20c | 21b ( ) | ( ) | ( ) | ( ) | (4a) |
| 21c | 22b ( ) | ( ) | ( ) | ( ) | (5a) |
| 22c | 24b ( ) | ( ) | ( ) | (1a) | ( ) |
| 23c | 25b ( ) | ( ) | ( ) | (3a) | ( ) |
| 24c | 26b ( ) | ( ) | ( ) | ( ) | (2a) |
| 25c | 27b ( ) | (5a) | ( ) | ( ) | ( ) |

PART V

As to the use of conventional demulsifying agents, reference is made to U. S. Patent No. 2,626,929, dated January 27, 1953, to De Groote, and particularly to Part III. Everything that appears therein applies with equal force and effect to the instant process, noting only that where reference is made to Example 13b in said test beginning in column 15 and ending in column 18, reference should be to Example 18b herein described. Note, however, what is said therein does not apply to the admixture with other conventional demulsifiers. The herein described demulsifiers are indeed primarily for use as such without further formulation.

It has been previously pointed out that the effectiveness of the herein described demulsifier is its ability to break oil field emulsions under conventional conditions without sludge and at the same time yielding bright pipeline oil, i. e., pipe line oil that is free from the minute traces of foreign matter whether suspended water or suspended emulsion droplets are due to non resolvable solids as described hereinafter.

In examining the results in the above table there are two things which are particularly striking. One is the fact that in many instances an emulsion can be treated with a nonionic demulsifier at a ratio of, for example, 1 to 15,000. The demulsifier may leave a trace of suspended matter in the oil and also permit a small amount of sludge at the interface. But, generally, by usual criteria neither factor is objectionable provided that (a) the upper oil layer meets pipeline requirements notwithstanding a mere haze, and the second (b) that the amount of sludge formed is slight and requires being drawn off once or twice a month from a second gun barrel, stock tank or the like. The amount of oil so discarded is insignificant either from the standpoint of the value of the oil or stream contamination.

However, whether justified or not it is frequently the practice to use a demulsifier that produces absolutely bright haze-free oil in the top layer and yields no interface layer at any time and not even over a period of time in the stock tank.

In such cases merely increasing the amount of nonionic demulsifier from 1 part to 15,000 emulsion to 1 part to 12,000 for example frequently causes no change in respect to either the haze or interface sludge or both.

However, if an admixture is made as previously described, and the mixtures used, then one obtains haze-free oil without an interface layer. In such instances frequently it will be found that the amount of such demulsifier is substantially the same as would be required in absence of the ammonium sulfonate, to give a conventionally acceptable resolution. Stated another way, the ammonium sulfonate in the admixture appears to contribute little or nothing as far as any demulsifying action in the usual sense of the word, but does either by itself or by synergistic combination result in the haze-free, sludge-free emulsion resolution.

What has been said immediately preceding may appear inconsistent in light of what was said in regard to U. S. Patent 1,299,385, dated April 1, 1919, to Rogers. At the time of the issuance of the Rogers patent a ratio of 1 to 1,000–1 to 2,000 was considered excellent. Total foreign matter acceptable in pipeline oil at that time ran from 1 to 3% and as a matter of fact a sludge layer or interface layer was taken for granted in many instances.

A slight sludge layer or interface layer is illustrated for example in a drawing which is part of the U. S. Patent 1,223,659, dated April 24, 1917, to Barnickel.

In light of what has been said previously no attempt is made to explain the effect obtained by the added anionic ammonium sulfonate. In some instances the haze in the upper layer pipeline oil and the sludge of the interface is not a refractory emulsion. As has been stated previously in the resolution of petroleum emulsions one sometimes obtains a sludge in the interface. This sludge may be of two different types or, for that matter, a mixture of two. One type is non-resolvable sludge. It consists of exceedingly fine iron oxide or sulfide or other insolubles. Furthermore, the insolubles may be organic

| Test No. | Demuls. temp., °F. | Demuls. ratio | Mixed demuls. used | Appearance | | NH₄ sulfonate alone | Appearance | | Non-ionic alone | Appearance | |
|---|---|---|---|---|---|---|---|---|---|---|---|
| | | | | Oil phase | Interface | | Oil phase | Interface | | Oil phase | Interface |
| 1d | 70 | 1:12,500 | 1c | Bright | Sharp | 1a | No treatment | No treatment | 1b | Bright | Heavy sludge. |
| 2d | 70 | 1:10,000 | 7c | do | do | 5a | do | do | 8b | do | Do. |
| 3d | 70 | 1:8,000 | 11c | do | do | 4a | do | do | 11b | Slight haze | Light sludge. |
| 4d | 150 | 1:8,000 | 18c | do | do | 6a | do | do | 19b | Bright | Heavy sludge. |
| 5d | 160 | 1:10,000 | 24c | do | do | 2a | do | do | 26b | do | Do. |

NOTE 1.—The following oils were used in the above tests: 1d, oil from Greta, Texas; 2d, oil from Andrews, Texas; 3d, oil from Thompson, Texas; 4d, oil from Brookhaven, Miss.; 5d, oil from Village Mills, Texas.

NOTE 2.—The phrase "No Treatment" as applied to the action of the NH₄ sulfonate alone should be qualified. In some cases the sulfonate may cause some of the emulsified water to drop out of the oil; but the amount is usually so small as to leave the oil still unfit for use. Addition of larger amounts of sulfonate does not further improve the situation, and may even cause gelation of some of the emulsion.

NOTE 3.—The above tests were conducted in the manner described in a treatise entitled "Treating Oil Field Emulsions" issued by the American Petroleum Institute in cooperation with the University of Texas (1949).

in nature such as waxes, paraffins, asphaltenes or the like. This type of sludge in essence is not the refractory emulsion of the water-in-oil type which has resisted demulsification. The other type of sludge is simply a more resistant or refractory sludge which apparently has been immune to demulsification in the usual operation. Sometimes either type of sludge or both separate out in tanks and become "tank bottoms."

We have satisfied ourselves, that in some instances and, perhaps in the majority of instances, the added anionic ammonium sulfonate does not act as a demulsifier but merely acts as a dispersant or a deflocculating agent for non-emulsified insolubles as noted above. In other words, the trace of impurity that would appear at the interface and the trace of haze that appeared in the upper layer when the nonionic demulsifier was used alone simply was dispersed in a much finer state by virtue of the presence of the anionic ammonium sulfonate and thus bright oil without a sludge layer was obtained and the upper layer still would meet pipeline requirements for the presence of foreign matter.

Having thus described our invention what we claim as new and desire to secure by Letters patent is:

1. A process for breaking petroleum emulsions of the water-in-oil type characterized by subjecting the emulsion to the action of a demulsifying agent; said demulsifying agent being a mixture of at least 60% by weight and not over 90% by weight of (A) an aromatic solvent-soluble nonionic demulsifier containing a plurality of lower oxyalkylene groups, and at least 10% by weight and not over 40% by weight of (B) ammonium salts obtained by the monosulfonation and neutralization of nonyl phenol foots; said foots being characterized by a dinonyl phenol to nonyl phenol ratio within the range of 2:1 to 3:1 and with the proviso that said nonyl phenol foots contain not less than 90% of nonylated phenols.

2. The process of claim 1 with the proviso that the nonionic demulsifying agent be obtained by use of at least one olefin oxide selected from the class consisting of ethylene oxide, propylene oxide and butylene oxide.

3. The process of claim 1 with the proviso that the nonionic demulsifier be obtained by the use of ethylene oxide in combination with propylene oxide.

4. A process for breaking petroleum emulsions of the water-in-oil type characterized by subjecting the emulsion to the action of a demulsifier; said demulsifier being obtained by a mixture of at least 60% by weight and not over 90% by weight of (A) an aromatic solvent-soluble nonionic demulsifier containing a plurality of lower oxyalkylene groups; said demulsifier being obtained by the use of propylene oxide and ethylene oxide exclusively with the proviso that not less than 25% by weight of the alkylene oxide reactant be propylene oxide, and at least 10% by weight and not over 40% by weight of (B) ammonium salts obtained by the mono-sulfonation and neutralization of nonyl phenol foots; said foots being characterized by a dinonyl phenol to nonyl phenol ratio within the range of 2:1 to 3:1 and with the proviso that said nonyl phenol foots contain not less than 90% of nonylated phenols.

5. The process of claim 4 with the proviso that the ratios of the two components (A) and (B), be roughly 90 parts by weight and 10 parts by weight; the latter being the ammonium sulfonate.

6. The process of claim 4 with the proviso that the ratios of the two components (A) and (B), be roughly 80 parts by weight and 20 parts by weight; the latter being the ammonium sulfonate.

7. The process of claim 4 with the proviso that the ratios of the two components (A) and (B) be roughly 75 parts by weight and 25 parts by weight; the latter being the ammonium sulfonate.

8. The process of claim 4 with the proviso that the ratios of the two components (A) and (B) be roughly 66.7 parts by weight and 33.3 parts by weight; the latter being the ammonium sulfonate.

9. The process of claim 4 with the proviso that the ratios of the two components (A) and (B) be roughly 60 parts by weight and 40 parts by weight; the latter being the ammonium sulfonate.

10. A process for breaking petroleum emulsions of the water-in-oil type characterized by subjecting the emulsion to the action of a demulsifying agent; said demulsifying agent being a mixture of at least 60% by weight and not over 90% by weight of (A) an aromatic solvent-soluble nonionic demulsifier containing a plurality of lower oxyalkylene groups, and at least 10% by weight and not over 40% by weight of (B) ammonium salts obtained by the monosulfonation and neutralization of nonyl phenol foots; and foots being characterized by a dinonyl phenol to nonyl phenol ratio within the range of 2:1 to 3:1 and with the proviso that said nonyl phenol foots contain not less than 90% of nonylated phenols; said emulsion resolution being characterized by a substantially bright upper phase and a sludge-free interface.

11. The process of claim 10 with the proviso that the nonionic demulsifying agent be obtained by use of at least one olefin oxide selected from the class consisting of ethylene oxide, propylene oxide and butylene oxide.

12. The process of claim 10 with the proviso that the nonionic demulsifier be obtained by the use of ethylene oxide in combination with propylene oxide.

13. A process for breaking petroleum emulsions of the water-in-oil type characterized by subjecting the emulsion to the action of a demulsifier; said demulsifier being obtained by a mixture of at least 60% by weight and not over 90% by weight of (A) an aromatic solvent-soluble nonionic demulsifier containing a plurality of lower oxyalkylene groups; said demulsifier being obtained by the use of propylene oxide and ethylene oxide exclusively with the proviso that not less than 25% by weight of the alkylene oxide reactant be propylene oxide, and at least 10% by weight and not over 40% by weight of (B) ammonium salts obtained by the mono-sulfonation and neutralization of nonyl phenol foots; said foots being characterized by a dinonyl phenol to nonyl phenol ratio within the range of 2:1 to 3:1 and with the proviso that said nonyl phenol foots contain not less than 90% of nonylated phenols; said emulsion resolution being characterized by a substantially bright upper phase and a sludge-free interface.

14. The process of claim 13 with the proviso that the ratios of the two components (A) and (B) be roughly 90 parts by weight and 10 parts by weight; the latter being the ammonium sulfonate.

15. The process of claim 13 with the proviso that the ratios of the two components (A) and (B) be roughly 80 parts by weight and 20 parts by weight; the latter being the ammonium sulfonate.

16. The process of claim 13 with the proviso that the ratios of the two components (A) and (B) be roughly 75 parts by weight and 25 parts by weight; the latter being the ammonium sulfonate.

17. The process of claim 13 with the proviso that the ratios of the two components (A) and (B) be roughly 66.7 parts by weight and 33.3 parts by weight; the latter being the ammonium sulfonate.

18. The process of claim 13 with the proviso that the ratios of the two components (A) and (B) be roughly 60 parts by weight and 40 parts by weight; the latter being the ammonium sulfonate.

19. A process for breaking petroleum emulsions of the water-in-oil type characterized by subjecting the emulsion to the action of a demulsifying agent; said demulsifying agent being a mixture of at least 60% by weight and not over 90% by weight of (A) an aromatic solvent-soluble nonionic demulsifier containing a plurality of lower oxyalkylene groups, and at least 10% by weight and not over 40% by weight of (B) ammonium salts obtained by the mono-sulfonation and neutralization of nonyl phenol foots; said foots being characterized by a dinonyl phenol to nonyl phenol ratio within the range of 2:1 to 3:1 and with the proviso that said nonyl phenol foots contain not less than 90% of nonylated phenols; said emulsion resolution being characterized by a substantially bright upper phase and a sludge-free interface; and with the further proviso that the amount of demulsifier used is sufficient that the aromatic solvent soluble nonionic demulsifier in the absence of the ammonium sulfonate would cause the emulsion to break.

20. The process of claim 19 with the proviso that the nonionic demulsifying agent be obtained by use of at least one olefin oxide selected from the class consisting of ethylene oxide, propylene oxide and butylene oxide.

21. The process of claim 19 with the proviso that the nonionic demulsifier be obtained by the use of ethylene oxide in combination with propylene oxide.

22. A process for breaking petroleum emulsions of the water-in-oil type characterized by subjecting the emulsion to the action of a demulsifier; said demulsifier being obtained by a mixture of at least 60% by weight and not over 90% by weight of (A) an aromatic solvent-soluble nonionic demulsifier containing a plurality of lower oxyalkylene groups; said demulsifier being obtained by the use of propylene oxide and ethylene oxide exclusively with the proviso that not less than 25% by weight of the alkylene oxide reactant be propylene oxide, and at least 10% by weight and not over 40% by weight of (B) ammonium salts obtained by the mono-sulfonation and neutralization of nonyl phenol foots; said foots being characterized by a dinonyl phenol to nonyl phenol ratio within the range of 2:1 to 3:1 and with the proviso that said nonyl phenol foots contain not less than 90% of a nonylated phenol; said emulsion resolution being characterized by a substantially bright upper phase and a sludge-free interface; and with the further proviso that the amount of demulsifier used is sufficient that the aromatic solvent soluble nonionic demulsifier in the absence of the ammonium sulfonate would cause the emulsion to break.

23. The process of claim 22 with the proviso that the ratios of the two components (A) and (B) be roughly 90 parts by weight and 10 parts by weight; the latter being the ammonium sulfonate.

24. The process of claim 22 with the proviso that the ratios of the two components (A) and (B) be roughly 80 parts by weight and 20 parts by weight; the latter being the ammonium sulfonate.

25. The process of claim 22 with the proviso that the ratios of the two components (A) and (B) be roughly 75 parts by weight and 25 parts by weight; the latter being the ammonium sulfonate.

26. The process of claim 22 with the proviso that the ratios of the two components (A) and (B) be roughly 66.7 parts by weight and 33.3 parts by weight; the latter being the ammonium sulfonate.

27. The process of claim 22 with the proviso that the ratios of the two components (A) and (B) be roughly 60 parts by weight and 40 parts by weight; the latter being the ammonium sulfonate.

References Cited in the file of this patent

UNITED STATES PATENTS

| | | |
|---|---|---|
| 2,249,757 | Flett | July 22, 1941 |
| 2,568,116 | De Groote et al. | Sept. 18, 1951 |
| 2,602,052 | De Groote | July 1, 1952 |